(12) United States Patent
Chen

(10) Patent No.: US 7,719,947 B2
(45) Date of Patent: May 18, 2010

(54) DEVICE FOR HOLOGRAPHIC STORAGE

(75) Inventor: Kuang-Vu Chen, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 453 days.

(21) Appl. No.: 11/746,655

(22) Filed: May 10, 2007

(65) Prior Publication Data

US 2008/0218820 A1 Sep. 11, 2008

(30) Foreign Application Priority Data

Mar. 9, 2007 (TW) ............................... 96108249 A

(51) Int. Cl.
*G11B 7/00* (2006.01)
(52) U.S. Cl. .................. 369/103; 369/112.28
(58) Field of Classification Search ........................ None
See application file for complete search history.

(56) References Cited

U.S. PATENT DOCUMENTS

| | | | | |
|---|---|---|---|---|
| 3,664,721 A | * | 5/1972 | Roberts | .......................... 359/3 |
| 4,487,472 A | * | 12/1984 | Asano | .......................... 359/18 |
| 6,157,473 A | | 12/2000 | Jang et al. | |
| 6,700,686 B2 | | 3/2004 | King et al. | |
| 6,721,076 B2 | | 4/2004 | King et al. | |
| 6,825,960 B2 | | 11/2004 | Curtis et al. | |

* cited by examiner

*Primary Examiner*—Wayne R Young
*Assistant Examiner*—Brian Butcher
(74) *Attorney, Agent, or Firm*—Jianq Chyun IP Office

(57) ABSTRACT

A reading device for holographic storage includes a light source, a light-directing component, an optical sensor and a prism. The light-directing component is disposed on the transmission path of the light beam provided by the light source and directs the light beam to get incidence at a holographic storage medium in a reading angle to generate a data beam. The optical sensor is suitable for reading the data beam and reproducing stored data. The prism is disposed between the light source and the holographic storage medium and rotatable about a rotation axis perpendicular to the transmission path of the light beam for fine-adjusting the reading angle. The prism and the light beam satisfy the following formula:

$$\sqrt{n^2-\sin^2 I_1} \times \sin A - \cos A \sin I_1 < 1$$

$I_1$ is the angle of incidence of the light beam, A is the vertex angle between the light incident surface and the light emerging surface and n is the refractive index of the prism.

21 Claims, 8 Drawing Sheets

DEVICE FOR HOLOGRAPHIC STORAGE

CROSS-REFERENCE TO RELATED APPLICATION

This application claims the priority benefit of Taiwan application serial no. 96108249, filed Mar. 9, 2007. All disclosure of the Taiwan application is incorporated herein by reference.

BACKGROUND OF THE INVENTION

1. Field of the Invention

The present invention relates to a device for holographic storage.

2. Description of Related Art

As one of products of the modern storage technology, an optical disc has superiority in enormous storage capacity, convenience to store, long lifetime of data keeping, low cost and robust from stored data damage, and a user can easily read the data stored in an optical disc by using an optical disc drive. In general speaking, a laser beam is focused on an optical disc by an objective lens to read and record the data stored in an optical disc, and the storage capacity of an optical disc depends on the area thereof. With the same disc area, to increase the storage capacity thereof, it needs to increase the recording density of the optical disc, which however may encounter a diffraction limit as a bottle neck for a development in increasing the storage capacity thereof.

Accordingly, to increase the data-recording density of an optical disc, a holography technique is provided, which adopts a 3-D multi-recording operation and features in a mass storage. A general holographic storage medium mainly makes of a photosensitive material of photopolymer or photorefractive crystal for recording an interference pattern generated by a signal beam and a reference beam.

During reading a holographic storage medium, a reading beam which has the same condition as the reference beam is employed to re-establish the information recorded on the holographic storage medium. It needs to be noted however, during recording, a photosensitive material of photopolymer usually get a variation of volume in addition to the expected variation of optical behavior. Therefore, if the information re-establishment is based on the condition of the reference beam during recording without taking into account that the volume of the photosensitive material gets changed during recording, the light intensity representing the re-established information is reduced accompanying an increased noise, which leads to an increased probability of errors during reading the information. Besides, a holographic storage medium recorded under different conditions has different volume shrinkage factors, which lowers the interchangeability thereof between different reading devices and further causes an inconvenience for use.

SUMMARY OF THE INVENTION

Accordingly, the present invention is directed to provide a reading device for holographic storage to reduce the probability of errors of a holographic storage medium during reading data.

The present invention is to provide a reading and recording device for holographic storage to reduce the probability of errors of a holographic storage medium during reading data.

As embodied and broadly described herein, the present invention provides a reading device for holographic storage including a light source, a light-directing component, an optical sensor and a prism. The light source provides a light beam. The light-directing component is disposed on the transmission path of the light beam emitted from the light source, wherein the light-directing component enables the light beam get incidence at a holographic storage medium in a reading angle to generate a data beam. The optical sensor is located on the transmission path of the data beam for reading the data beam and reproducing the stored data. The prism is disposed between the light source and the holographic storage medium for fine-adjusting the reading angle, wherein the prism has a light incident surface and a light emerging surface, the light beam enters the prism from the light incident surface and emits out of the prism from the light emerging surface, the prism is rotatable about a rotation axis perpendicular to the transmission path of the light beam, and the prism and the light beam satisfy the following formula:

$$\sqrt{n^2 - \sin^2 I_1} \times \sin A - \cos A \sin I_1 < 1$$

where $I_1$ is the angle of incidence of the light beam entering the prism, A is the vertex angle between the light incident surface and the light emerging surface and n is the refractive index of the prism.

As embodied and broadly described herein, the present invention also provides a reading and recording device for holographic storage including a light source, a beam-splitting device, a light-directing component, an optical sensor, a spatial optical modulator (SLM) and a prism. The light source herein provides a light beam. The light-directing component is disposed on the transmission path of the light beam emitted from the light source. During reading, the light-directing component enables the light beam get incidence at a holographic storage medium in a reading angle to generate a data beam. The beam-splitting device is disposed on the transmission path of the light beam so that the beam-splitting device splits a recording beam from the light beam during recording, the recording beam carries the data to be stored after passing through the SLM and the recording beam and the initial light beam interfere with each other to create an interference pattern on the holographic storage medium. The optical sensor is located on the transmission path of the data beam for reading the data beam and reproducing the stored data. The prism is disposed between the light source and the holographic storage medium for fine-adjusting the reading angle, wherein the prism has a light incident surface and a light emerging surface, the light beam enters the prism from the light incident surface and emits out of the prism from the light emerging surface, the prism is rotatable about a rotation axis perpendicular to the transmission path of the light beam, and the prism and the light beam satisfy the following formula:

$$\sqrt{n^2 - \sin^2 I_1} \times \sin A - \cos A \sin I_1 < 1$$

where $I_1$ is the angle of incidence of the light beam entering the prism, A is the vertex angle between the light incident surface and the light emerging surface and n is the refractive index of the prism.

The present invention employs a rotatable prism disposed on the transmission path of the light beam and makes the rotation axis of the prism perpendicular to the transmission path of the light beam. In this way, the rotatable prism is able to fine-adjust the angle of the light beam emitted from the light emerging surface of the prism. It is noted that the relation between the rotation angle of the prism and the deviation angle of the light beam is nonlinear; that is, a tiny variation of the deviation angle is in response to a large rotation angle of the prism. Thus, the fine-adjustment of the reading angle of the light beam can be done without a precision driving apparatus.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
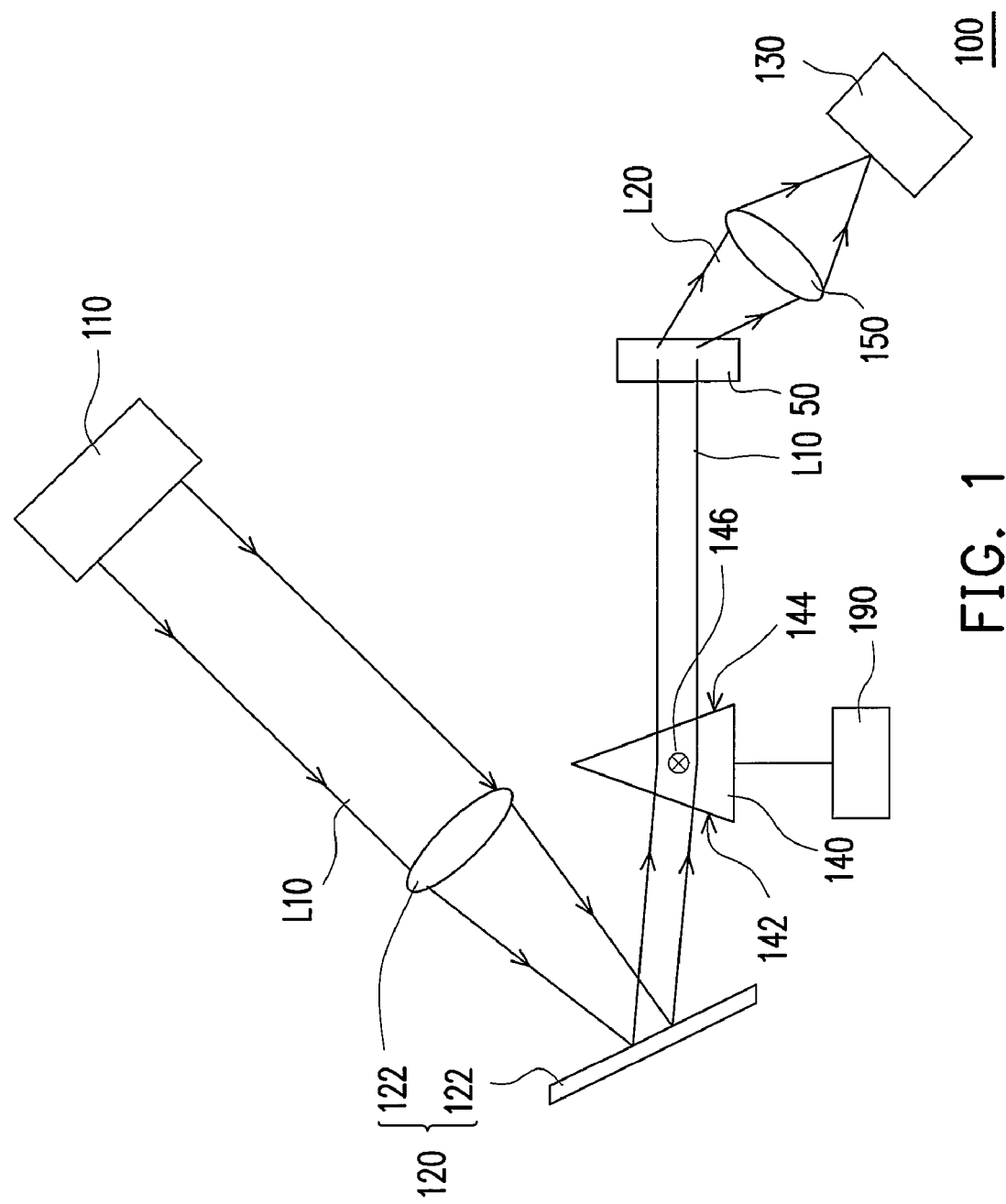
FIG. 1 is a transmission path diagram of a reading device for holographic storage according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

The First Embodiment

Figure 2:
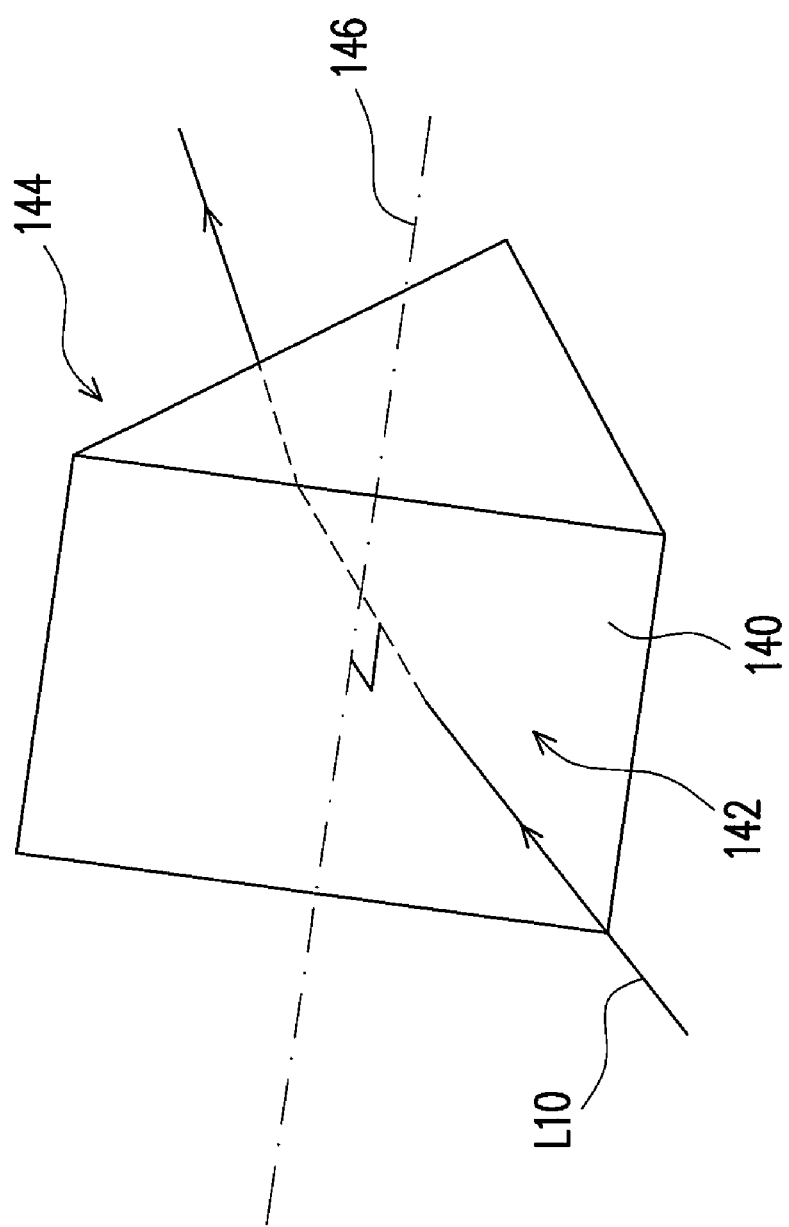
FIG. 2 is a 3-D diagram showing the light beam passing through the prism of FIG. 1.
Figure 3:
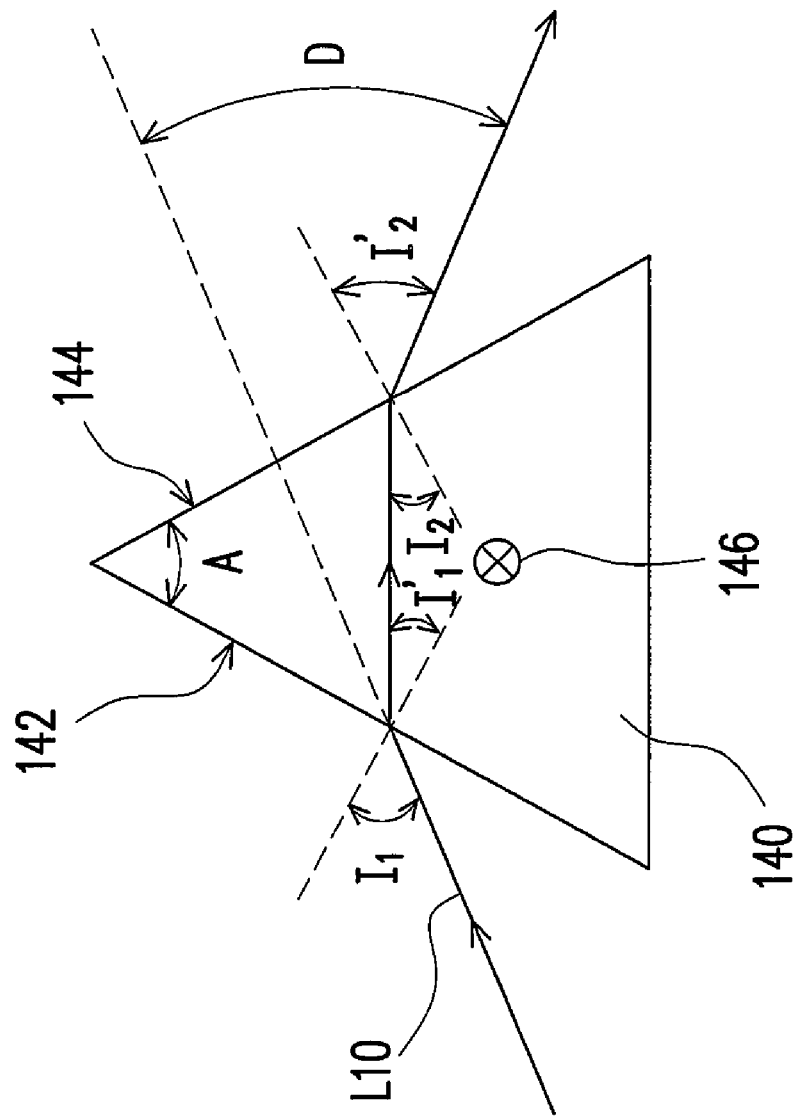
FIG. 3 is a transmission path diagram showing the light beam passing through the prism of FIG. 1.

FIG. 1 is a transmission path diagram of a reading device for holographic storage according to an embodiment of the present invention, FIG. 2 is a 3-D diagram showing the light beam passing through the prism of FIG. 1 and FIG. 3 is a transmission path diagram showing the light beam passing through the prism of FIG. 1. Referring to FIGS. 1 and 2, a reading device for holographic storage 100 of the embodiment includes a light source 110, a light-directing component 120, an optical sensor 130 and a prism 140. The light source 110 is suitable for providing a light beam L10. The light-directing component 120 disposed on the transmission path of the light beam L10 is able to direct the light beam L10 to get incidence at a holographic storage medium 50 in a at least one reading angle. After the light beam L10 enters the holographic storage medium 50, a data beam L20 is generated and the light beam L10 carries the information of an interference pattern. When the light beam L10 gets incidence at the holographic storage medium 50 in different reading angles, the generated data beam L20 carries different interference patterns.

The optical sensor 130 is located on the transmission path of the data beam L20, wherein the optical sensor 130 is, for example, a CCD (charge coupling device) or a CMOS (complementary metal oxide semiconductor) image sensor and the optical sensor 130 is suitable for reading the interference patterns carried by the data beam L20 and generating a data signal. In the present embodiment, the reading device for holographic storage 100 further employs a lens 150 disposed between the holographic storage medium 50 and the optical sensor 130 for focusing the data beam L20 onto the optical sensor 130, which makes the reading procedure of the data beam L20 more efficiently.

The above-mentioned prism 140 is disposed between the light source 110 and the holographic storage medium 50, and the prism 140 is rotatable for fine-adjusting the transmission path of the light beam L10 such that the reading angle in which the light beam L10 gets incidence at the holographic storage medium 50 can be finely adjusted. In this way, the volume shrinkage caused during recording data on the holographic storage medium 50 can be compensated. In more detail, the prism 140 has a light incident surface 142 and a light emerging surface 144, the light beam L10 enters the prism 140 from the light incident surface 142 and emits out of the prism 140 from the light emerging surface 144, the prism 140 is rotatable about a rotation axis 146 perpendicular to the transmission path of the light beam L10 to fine-adjust the transmission path of the light beam L10. The prism 140 may be rotated through a driving apparatus 190 and the driving apparatus includes, for example, a motor and other transmission devices to make the prism 140 rotate.

Referring to FIG. 3, $I_1$ herein represents the angle of incidence of the light beam L10 prior to passing the light incident surface 142, $I_1'$ represents the refraction angle of the light beam L10 after passing the light incident surface 142, $I_2$ represents the angle of incidence of the light beam L10 prior to passing the light emerging surface 144, and $I_2'$ represents the refraction angle of the light beam L10 after passing the light emerging surface 144, A is the vertex angle between the light incident surface 142 and the light emerging surface 144 and D represents the deviation angle of the light beam L10, i.e., the included angle between the transmission path of the light beam L10 prior to passing the prism 140 and the transmission path of the light beam L10 after passing the prism 140. The deviation angle D and the angle of incidence $I_1$ satisfy the following formula:

$$D = I_1 - A + \sin^{-1}(\sqrt{n^2 - \sin^2 I_1} \times \sin A - \cos A \sin I_1)$$

where n is the refractive index of the prism 140. In addition, to avoid a total internal reflection (TIR) after the light beam L10 enters the prism 140, the prism 140 and the light beam L10 must satisfy the following formula:

$$\sqrt{n^2 - \sin^2 I_1} \times \sin A - \cos A \sin I_1 < 1$$

Figure 4:
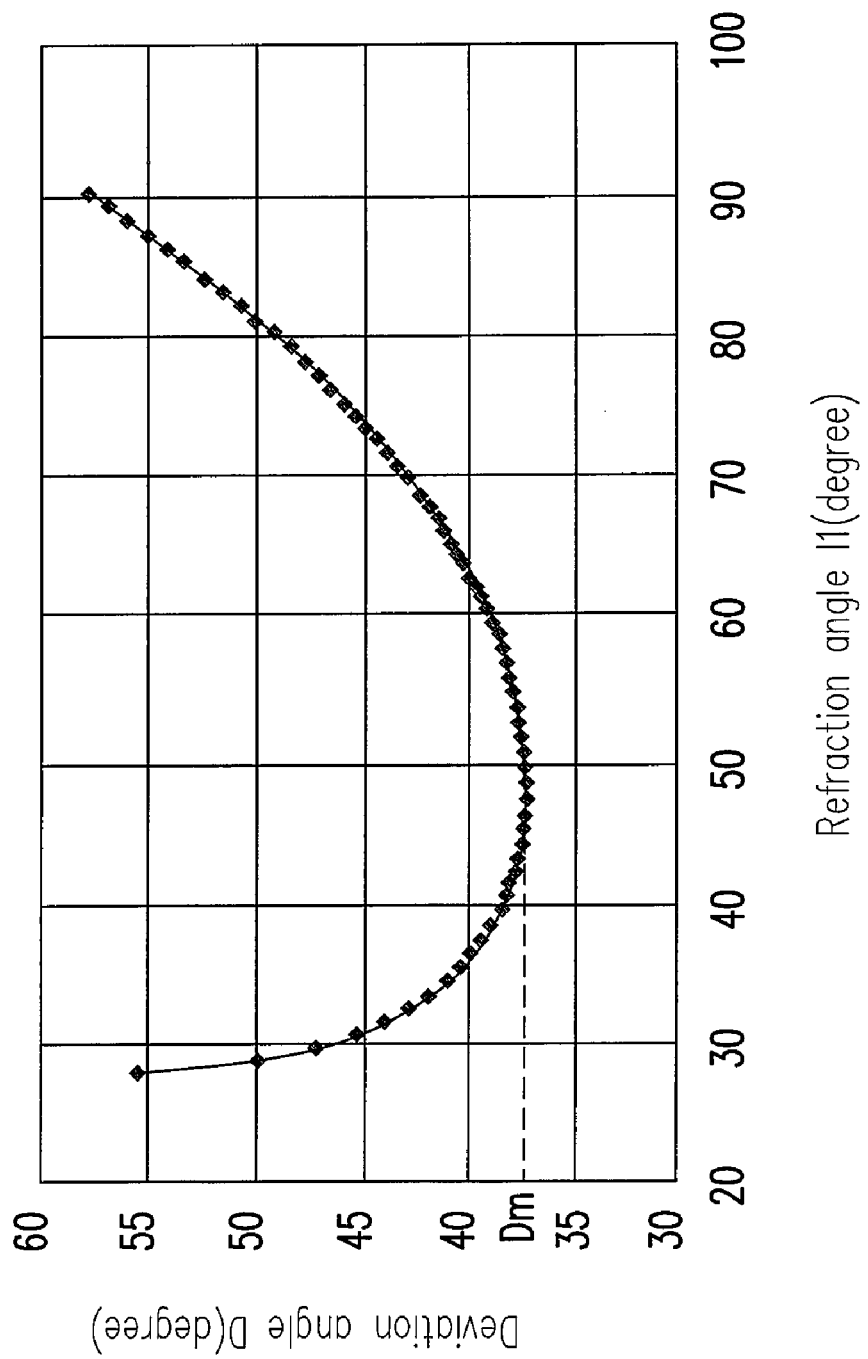
FIG. 4 is a graphic plot of the deviation angle vs. the angle of incidence wherein the refractive index of the prism is assumed as 1.5 and the vertex angle between the light incident surface and the light emerging surface is 60 degree.

FIG. 4 is a graphic plot of the deviation angle vs. the angle of incidence, wherein the refractive index of the prism is assumed as 1.5 and the vertex angle between the light incident surface and the light emerging surface is 60 degree. Referring to FIGS. 3 and 4, when the deviation angle D in FIG. 4 approaches the minimum deviation angle $D_m$ (the minimal value of the deviation angle D), even the angle of incidence $I_1$ has a large change, the deviation angle D varies a little in response thereto. In other words, in response to a large rotation angle of the prism 140, the reading angle varies a little therewith. By means of the specific relationship, the reading angle can be precisely fine-adjusted without employing a precision driving apparatus.

Besides, when the angle of incidence $I_1$ reaches a specific angle, the deviation angle D switches the tendency direction of the variation. For example, prior to reaching the minimum deviation angle $D_m$, it can be seen from FIG. 4 that the deviation angle D is gradually decreased with an increasing angle of incidence $I_1$, while after the deviation angle D reaches the minimum deviation angle $D_m$, the deviation angle D is in turn increased with an increasing angle of incidence $I_1$. By using the minimum deviation angle effect, a user is required to rotate the prism 140 in a mono-direction only for fine-adjusting the deviation angle D back and forth.

Since the reading device for holographic storage 100 has a rotatable prism 140, the transmission path of the light beam L10 can be fine-adjusted, such that the reading angle of the light beam L10 entering the holographic storage medium 50 can be finely adjusted. In this way, a volume variation caused during recording the holographic storage medium 50 can be compensated by fine-adjusting the reading angle for lowering the probability of reading errors. In addition, the nonlinearity relationship between the angle of incidence I1 and the deviation angle D results in that when the deviation angle D approaches the minimum deviation angle $D_m$, the deviation angle D varies a little only in response to a large rotation angle of the prism 140. Therefore, the reading angle can be precisely fine-adjusted without a precision driving apparatus. Moreover, the minimum deviation angle effect of the prism 140 can be used for the driving apparatus to adjust the deviation angle D back and fourth in a mono-direction, which can more easily control the driving apparatus and reduce the error caused by a back play of the driving apparatus.

Figure 5:
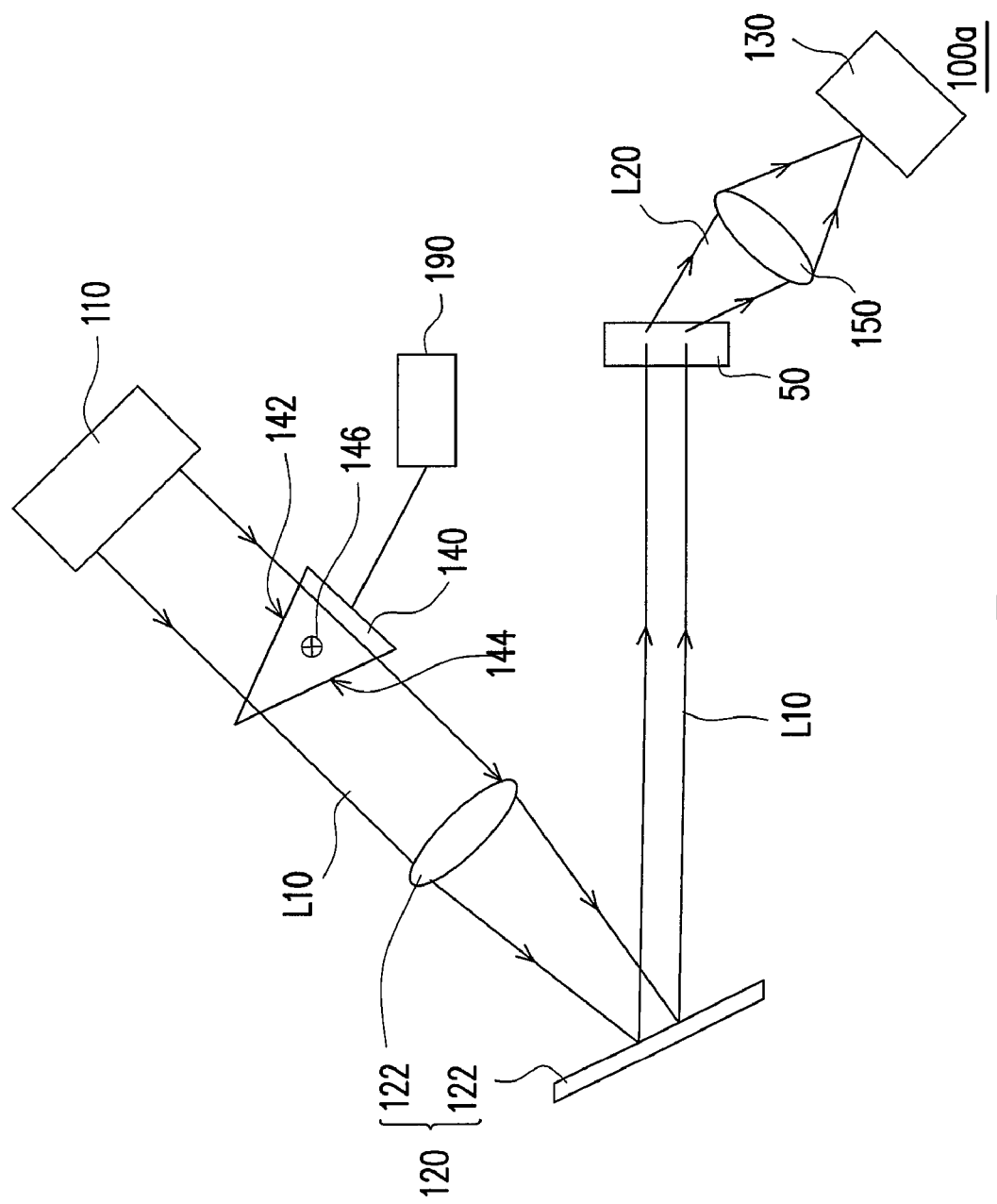
FIG. 5 is a transmission path diagram of a reading device for holographic storage according to another embodiment of the present invention.
Figure 6:
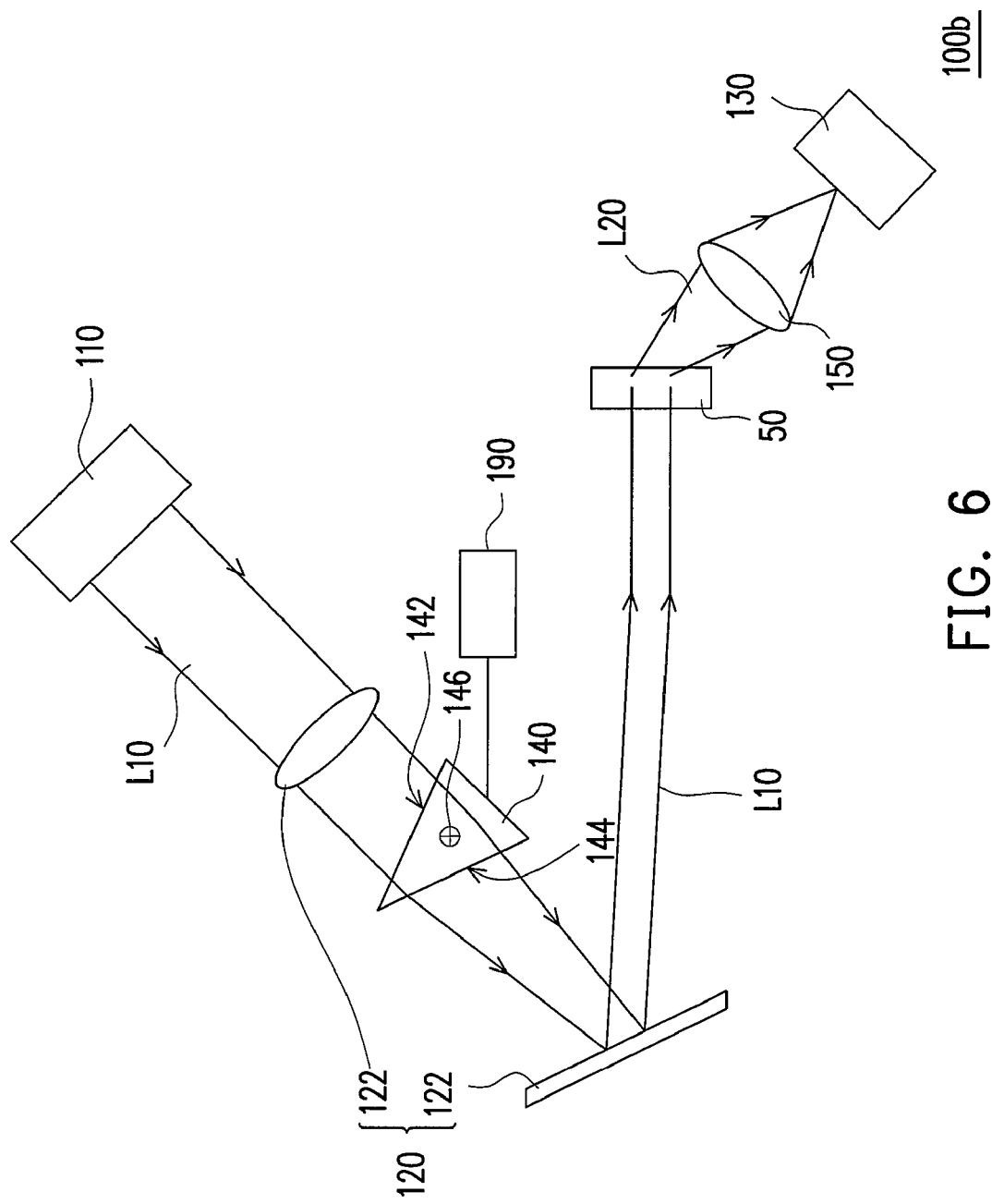
FIG. 6 is a transmission path diagram of a reading device for holographic storage according to yet another embodiment of the present invention.

The above-mentioned light-directing component 120 includes a plurality of optical components 122, and the optical component 122 is, for example, a lens, a reflector, etc. In the present embodiment, the optical components 122 are, for example but not limited by the present invention, a lens and a reflector. One skilled in the art can use other optical component with a different number and a different function for implementation. In addition, the layout of embodiment wherein the prism 140 is disposed between the light-directing component 120 and the holographic storage medium 50 is an example, which the present invention does not limit thereto; for example, the prism 140 can be also disposed between the light-directing component 120 and the light source 110 or between the optical components 122 of the light-directing component 120. FIG. 5 is a transmission path diagram of a reading device for holographic storage according to another embodiment of the present invention and FIG. 6 is a transmission path diagram of a reading device for holographic storage according to yet another embodiment of the present invention. Referring to FIGS. 5 and 6, the prism 140 of the reading device for holographic storage 100a in FIG. 5 is disposed between the light-directing component 120 and the light source 110, while in FIG. 6, the prism 140 of the reading device for holographic storage 100b is disposed between the optical components 122 of the light-directing component 120.

The Second Embodiment

Figure 7:
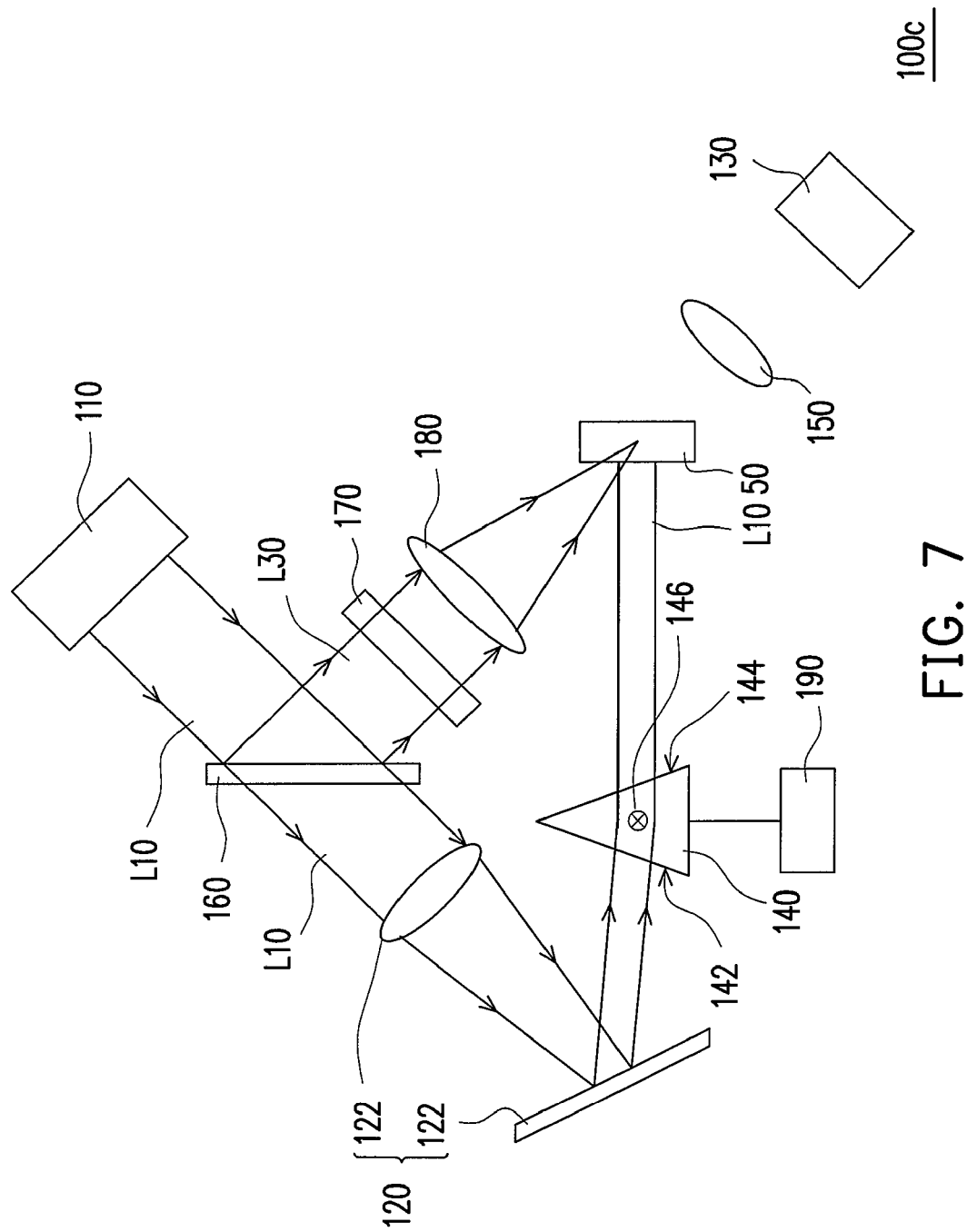
FIG. 7 is a transmission path diagram of a reading and recording device for holographic storage during recording according to the second embodiment of the present invention.
Figure 8:
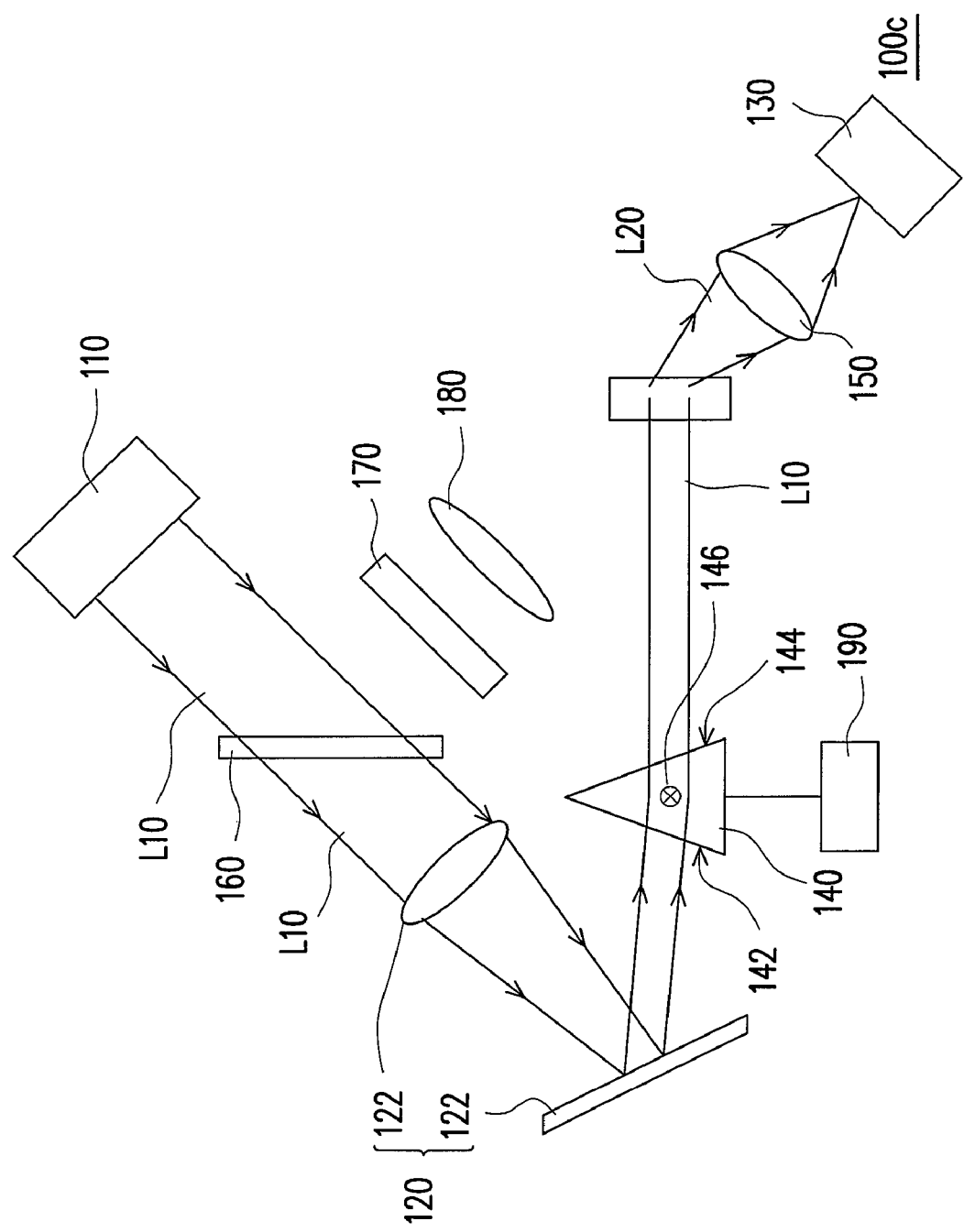
FIG. 8 is a transmission path diagram of the reading and recording device for holographic storage during reading of FIG. 7.

FIG. 7 is a transmission path diagram of a reading and recording device for holographic storage during recording according to the second embodiment of the present invention and FIG. 8 is a transmission path diagram of the reading and recording device for holographic storage during reading of FIG. 7. For simplicity, all the components in the second embodiment same as or similar to that of the first embodiment are marked in the same way; and the same features are omitted herein.

Referring to FIG. 7, differently from the first embodiment, a reading and recording device for holographic storage 100c in the second embodiment further includes a beam-splitting device 160, for example a beam splitter, for the light beam L10 to generate a recording beam L130 so as to make the light beam L10 (a reference beam) and the recording beam L130 generate an interference pattern on the holographic storage medium 50 and to record the interference pattern on the holographic storage medium 50. In addition, a spatial optical modulator (SLM) 170 is disposed between the beam-splitting device 160 and the holographic storage medium 50, and the SLM 170 is located on the transmission path of the recording beam L130 to screen parts of the recording beam L130 so that the recording beam L130 is able to irradiate parts as the data to be stored on the holographic storage medium 50. The above-mentioned SLM 170 can be, for example, a digital micro-mirror device (DMD) or an LCD (liquid crystal device) panel. A lens 180 can be further disposed between the SLM 170 and the holographic storage medium 50 for focusing the recording beam L130 onto the holographic storage medium 50.

It is noted that the above-mentioned beam-splitting device 160 is not limited to a beam splitter. Anyone skilled in the art can use other optical component with a different component number and a different function for implementing the beam-splitting device 160, which the present invention does not limit thereto.

Referring to FIG. 8, the reading and recording device for holographic storage 100c is similar to the reading device for holographic storage 100 in the first embodiment for reading the holographic storage medium 50, which has been depicted in the first embodiment and is omitted to describe herein. In addition, the prism 140 of the present embodiment can be disposed in another way and not limited by FIGS. 7 and 8 where the prism 140 is disposed between the light-directing component 120 and the holographic storage medium 50. For example, anyone skilled in the art can refer to the layout of the reading devices for holographic storage 100a or 100b to dispose the prism 140.

In summary, the reading device for holographic storage and the reading and recording device for holographic storage of the present invention respectively have a rotatable prism for fine-adjusting the transmission path of the light beam and further fine-adjusting the reading angle of the light beam entering the holographic storage medium. In this way, a volume variation of the holographic storage medium during recording can be compensated by fine-adjusting the reading angle, which is able to reduce the chance of reading errors and advance the interchangeablity of the holographic storage medium. In addition, the angle of incidence and the deviation angle are subjected to a nonlinearity relationship, and when the deviation angle approaches the minimum deviation angle, even a large rotation angle of the prism causes a minor change of the deviation angle only. Therefore, a precise fine-adjustment of the reading angle can be achieved without a precision driving apparatus. Besides, the minimum deviation angle effect of the prism can be utilized for the driving apparatus to adjust the deviation angle back and fourth by a mono-direction driving, which further makes controlling the driving apparatus more easily and reduces the error caused by a back play in the driving apparatus.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A reading device for holographic storage, comprising:
   a light source for providing a light beam;
   a light-directing component, disposed on a transmission path of the light beam emitted from the light source, wherein the light-directing component enables the light beam to get incidence at a holographic storage medium in a reading angle to generate a data beam;
   an optical sensor, located on a transmission path of the data beam for reading the data beam and reproducing a stored data; and
   a prism, disposed between the light source and the holographic storage medium for fine-adjusting the reading angle, wherein the prism has a light incident surface and a tight emerging surface, the light beam enters the prism from the light incident surface and emits out of the prism from the light emerging surface, the prism is rotatable about a rotation axis perpendicular to the transmission path of the light beam, the prism and the light beam satisfy the following formula:

$$\sqrt{n^2-\sin^2 I_1} \times \sin A - \cos A \sin I_1 < 1$$

wherein $I_1$ is an angle of incidence of the light beam entering the prism, A is a vertex angle between the light incident surface and the light emerging surface and n is a refractive index of the prism.

2. The reading device for holographic storage according to claim 1, wherein the prism is disposed between the light source and the light-directing component.

3. The reading device for holographic storage according to claim 1, wherein the prism is disposed between the light-directing component and the holographic storage medium.

4. The reading device for holographic storage according to claim 1, wherein the light-directing component comprises a plurality of optical components and the prism is disposed between the optical components.

5. The reading device for holographic storage according to claim 1, further comprising a driving apparatus to drive the prism for rotating about the rotation axis.

6. The reading device for holographic storage according to claim 5, wherein the driving apparatus comprises a motor.

7. The reading device for holographic storage according to claim 1, wherein the optical sensor comprises a charge coupling device or a complementary metal oxide semiconductor image sensor.

8. A reading and recording device for holographic storage, comprising:
   a light source for providing a light beam;
   a beam-splitting device, disposed on a transmission path of the light beam, wherein during recording, the beam-splitting device splits a recording beam from the light beam and the recording beam and the light beam together generate an interference pattern on a holographic storage medium;
   a spatial optical modulator, disposed on a transmission path of the recording beam for providing the data to be stored;
   a light-directing component, disposed on the transmission path of the light beam, wherein the light-directing component enables the light beam to get incidence at the holographic storage medium in a reading angle to generate a data beam;
   an optical sensor, located on the transmission path of the data beam for reading the data beam and reproducing the stored data; and
   a prism, disposed between the light source and the holographic storage medium for fine-adjusting the reading angle, wherein the prism has a light incident surface and a light emerging surface, the light beam enters the prism from the light incident surface and emits out of the prism from the light emerging surface, the prism is rotatable about a rotation axis perpendicular to the transmission path of the light beam, the prism and the light beam satisfy the following formula:

$$\sqrt{n^2-\sin^2 I_1} \times \sin A - \cos A \sin I_1 < 1$$

wherein $I_1$ is an angle of incidence of the light beam entering the prism, A is a vertex angle between the light incident surface and the light emerging surface and n is a refractive index of the prism.

9. The reading and recording device for holographic storage according to claim 8, wherein the prism is disposed between the light source and the light-directing component.

10. The reading and recording device for holographic storage according to claim 8, wherein the prism is disposed between the light-directing component and the holographic storage medium.

11. The reading and recording device for holographic storage according to claim 8, wherein the light-directing component comprises a plurality of optical components and the prism is disposed between the optical components.

12. The reading and recording device for holographic storage according to claim 8, further comprising a driving apparatus to drive the prism for rotating about the rotation axis.

13. The reading and recording device for holographic storage according to claim 12, wherein the driving apparatus comprises a motor.

14. The reading and recording device for holographic storage according to claim 8, wherein the optical sensor comprises a charge coupling device or a complementary metal oxide semiconductor image sensor.

15. The reading and recording device for holographic storage according to claim 8, wherein the spatial optical modulator comprises a liquid crystal device panel or a digital micro-mirror device.

16. The reading device for holographic storage according to claim 1, wherein the prism does not deflect the light beam causing the light beam to enter the holographic storage medium at substantially different portions.

17. The reading device for holographic storage according to claim 1, wherein the prism is just one rotatable prism.

18. The reading device for holographic storage according to claim 1, wherein the rotation axis does not go through the light incident surface and the light emerging surface of the prism.

19. The reading and recording device for holographic storage according to claim 8, wherein the prism does not deflect the light beam causing the light beam to enter the holographic storage medium at substantially different portions.

20. The reading and recording device for holographic storage according to claim 8, wherein the prism is just one rotatable prism.

21. The reading and recording device for holographic storage according to claim 8, wherein the rotation axis does not go through the light incident surface and the light emerging surface of the prism.

* * * * *